United States Patent
Baltas et al.

(10) Patent No.: US 10,287,987 B2
(45) Date of Patent: May 14, 2019

(54) NOISE REDUCING VANE

(71) Applicant: United Technologies Corporation, Hartford, CT (US)

(72) Inventors: Constantine Baltas, Manchester, CT (US); Oliver V. Atassi, Longmeadow, MA (US)

(73) Assignee: United Technologies Corporation, Farmington, CT (US)

( * ) Notice: Subject to any disclaimer, the term of this patent is extended or adjusted under 35 U.S.C. 154(b) by 1260 days.

(21) Appl. No.: 14/204,983

(22) Filed: Mar. 11, 2014

(65) Prior Publication Data
US 2014/0348630 A1    Nov. 27, 2014

Related U.S. Application Data

(63) Continuation-in-part of application No. 12/838,620, filed on Jul. 19, 2010, now Pat. No. 8,800,261.

(51) Int. Cl.
F02C 7/24 (2006.01)
F02K 1/09 (2006.01)
F02K 3/06 (2006.01)

(52) U.S. Cl.
CPC ............... F02C 7/24 (2013.01); F02K 1/09 (2013.01); F02K 3/06 (2013.01); F05D 2260/96 (2013.01)

(58) Field of Classification Search
CPC .... F02C 7/24; F02C 7/045; F02K 1/09; F02K 3/06; F01D 9/02; F01D 9/041; F05D 2260/96; F05D 2260/961; F05D 2240/121; F05D 2240/123; F05D 2240/303; F05D 2240/305; F05D 2250/14; F05D 2270/70
See application file for complete search history.

(56) References Cited

U.S. PATENT DOCUMENTS

| 3,262,658 | A | * | 7/1966 | Reilly | B64C 23/00 244/207 |
| 3,333,817 | A | * | 8/1967 | Rhomberg | B64C 11/18 415/181 |
| 4,208,167 | A | * | 6/1980 | Yasugahira | F01D 5/145 415/191 |
| 4,741,667 | A | * | 5/1988 | Price | F01D 5/141 415/115 |
| 5,088,892 | A | * | 2/1992 | Weingold | F01D 5/145 415/193 |

(Continued)

FOREIGN PATENT DOCUMENTS

| EP | 0837247 A2 | 4/1998 |
| EP | 1247938 A2 | 10/2002 |
| EP | 2410165 A2 | 1/2012 |

OTHER PUBLICATIONS

The European Search Report dated Aug. 4, 2015 for European Application No. 15158684.9.

Primary Examiner — David E Sosnowski
Assistant Examiner — Wayne A Lambert
(74) Attorney, Agent, or Firm — Kinney & Lange, P.A.

(57) ABSTRACT

A gas turbine engine includes a first airflow structure and a second airflow structure disposed aft of the first airflow structure. The second airflow structure includes a leading edge region. A thickness of the leading edge region is based on a thickness of a wake in the airflow produced by the first airflow structure when the airflow passes between the first airflow structure and the second airflow structure.

16 Claims, 7 Drawing Sheets

(56) References Cited

U.S. PATENT DOCUMENTS

| | | | | |
|---|---|---|---|---|
| 5,151,014 A * | 9/1992 | Greenwald | ............... | B64C 3/58 416/237 |
| 5,169,288 A * | 12/1992 | Gliebe | ................... | F02C 7/045 415/119 |
| 5,460,488 A * | 10/1995 | Spear | ........................ | F01D 5/22 416/191 |
| 6,004,095 A * | 12/1999 | Waitz | ................... | B64C 21/025 415/115 |
| 6,079,948 A * | 6/2000 | Sasaki | .................... | F01D 5/141 415/191 |
| 6,139,259 A * | 10/2000 | Ho | ......................... | B64C 11/20 415/119 |
| 6,499,942 B1 * | 12/2002 | Nonaka | ................ | F04D 19/042 415/193 |
| 6,527,510 B2 * | 3/2003 | Olhofer | ................... | F04D 21/00 415/181 |
| 6,554,564 B1 | 4/2003 | Lord | | |
| 6,682,301 B2 * | 1/2004 | Kuhne | .................... | F01D 5/141 415/181 |
| 6,866,479 B2 * | 3/2005 | Ishizaka | ................ | F01D 25/30 415/209.1 |
| 7,090,463 B2 * | 8/2006 | Milburn | ................ | F01D 5/147 415/211.2 |
| 7,195,456 B2 * | 3/2007 | Aggarwala | ............. | F01D 5/145 415/208.2 |
| 7,621,718 B1 * | 11/2009 | Liang | ...................... | F01D 5/186 415/115 |
| 8,561,414 B1 * | 10/2013 | Praisner | ................... | F01D 9/04 415/191 |
| 2002/0048510 A1 | 4/2002 | Spano et al. | | |
| 2002/0197156 A1 * | 12/2002 | Haller | ..................... | F01D 5/141 415/192 |
| 2003/0177640 A1 * | 9/2003 | Marques | ................. | B23P 6/002 29/889.1 |
| 2005/0274103 A1 * | 12/2005 | Prasad | .................... | B64D 33/02 60/226.1 |
| 2006/0257238 A1 | 11/2006 | Fiala | | |
| 2009/0155062 A1 * | 6/2009 | Guimbard | ............... | F01D 5/141 415/194 |
| 2009/0169371 A1 * | 7/2009 | Tsuchiya | ................. | F01D 5/141 415/193 |
| 2012/0011825 A1 | 1/2012 | Hall et al. | | |
| 2013/0319002 A1 * | 12/2013 | Sidelkovskiy | ............ | F02C 7/20 60/797 |
| 2015/0104296 A1 * | 4/2015 | Yokoyama | ................ | F02B 37/24 415/146 |
| 2015/0260051 A1 * | 9/2015 | Gallagher | ................ | F02K 3/06 415/144 |

* cited by examiner

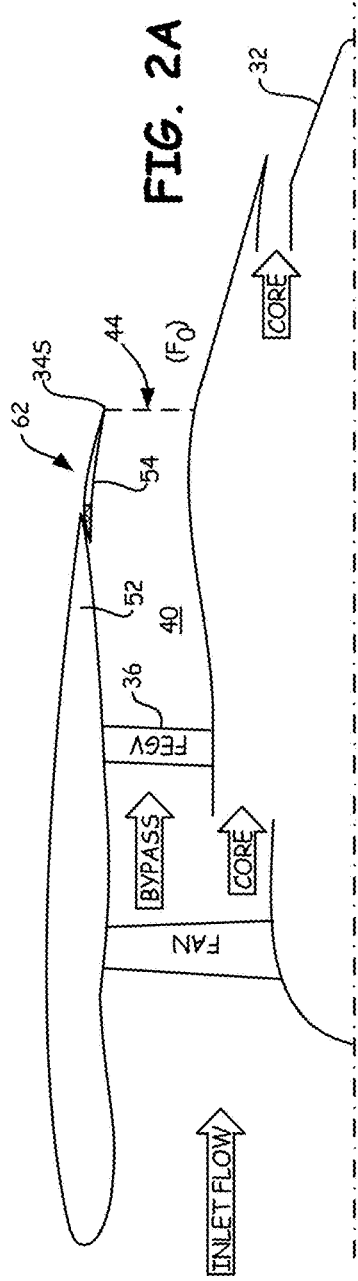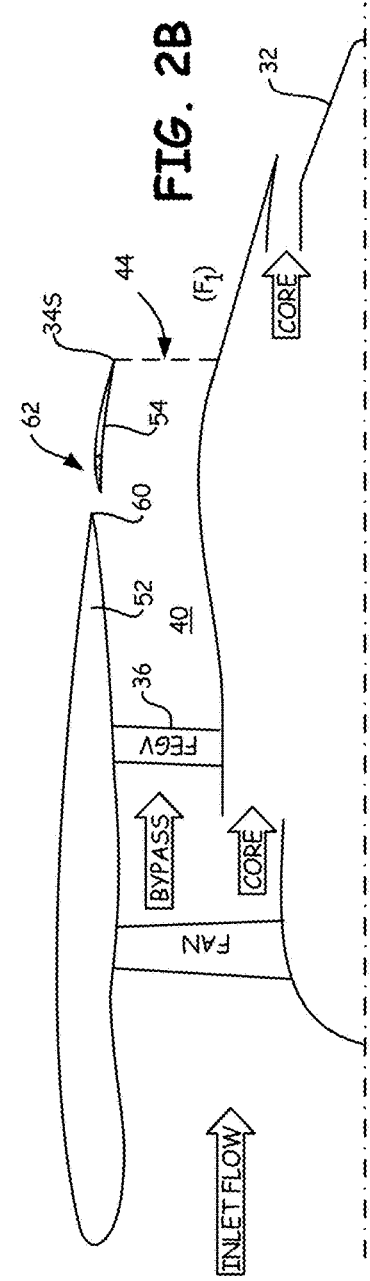

NOISE REDUCING VANE

CROSS-REFERENCE TO RELATED APPLICATION(S)

This application is a continuation-in-part of U.S. patent application Ser. No. 12/838,620 (filed 19 Jul. 2010). This application claims priority to U.S. Provisional Application No. 61/793,218, filed on Mar. 15, 2013, and entitled "NOISE REDUCING VANE," the disclosure of which is incorporated by reference in its entirety.

BACKGROUND

The present disclosure relates to a gas turbine engine, and more particularly to an engine having an airflow structure that helps mitigate acoustic response to reduce total effective perceived noise level (EPNL).

Gas turbine engines which have an engine cycle modulated with a variable area fan nozzle (VAFN) provide a smaller fan nozzle exit area during cruise conditions and a larger fan nozzle exit area during take-off and landing conditions. The VAFN may generate noise as upstream turbulence interacts with the VAFN.

Fan exit guide vanes (FEGVs) are disposed in gas turbine engines downstream from a fan to de-swirl circumferentially flowing air discharged from the fan into an axial direction prior to the air flowing into a bypass flow duct. The FEGVs may generate noise as upstream turbulence generated by the fan interacts with the FEGVs.

SUMMARY

According to the present invention, a gas turbine engine includes a first airflow structure and a second airflow structure disposed aft of the first airflow structure. The second airflow structure includes a leading edge region. A thickness of the leading edge region is based on a thickness of a wake in the airflow produced by the first airflow structure when the airflow passes between the first airflow structure and the second airflow structure.

In another embodiment of the present invention, a gas turbine engine includes a rotor with a blade, and a vane disposed aft of the rotor for adjusting an airflow from the rotor. The vane has a suction surface, a pressure surface, and a leading edge region joining the suction surface and the pressure surface. The leading edge region and a portion of the pressure surface form a profile that is substantially parallel to a portion of a velocity profile of a wake produced in the airflow by the blade.

In another embodiment of the present invention, a method for optimizing a vane to reduce noise generated by airflow between an upstream blade and the vane includes first establishing an aerodynamic configuration of the vane as a baseline configuration of the vane. A wake thickness is determined of a wake in the airflow produced by the blade. A leading edge thickness of the vane is adjusted relative the baseline configuration based on the wake thickness.

BRIEF DESCRIPTION OF THE DRAWINGS

The various features and advantages of this disclosure will become apparent to those skilled in the art from the following detailed description of the currently preferred embodiment. The drawings that accompany the detailed description can be briefly described as follows:

FIG. 2A is a sectional side view of aVAFN in a closed position;

FIG. 2B is a sectional side view of the VAFN in an open position;

DETAILED DESCRIPTION

Figure 1A:
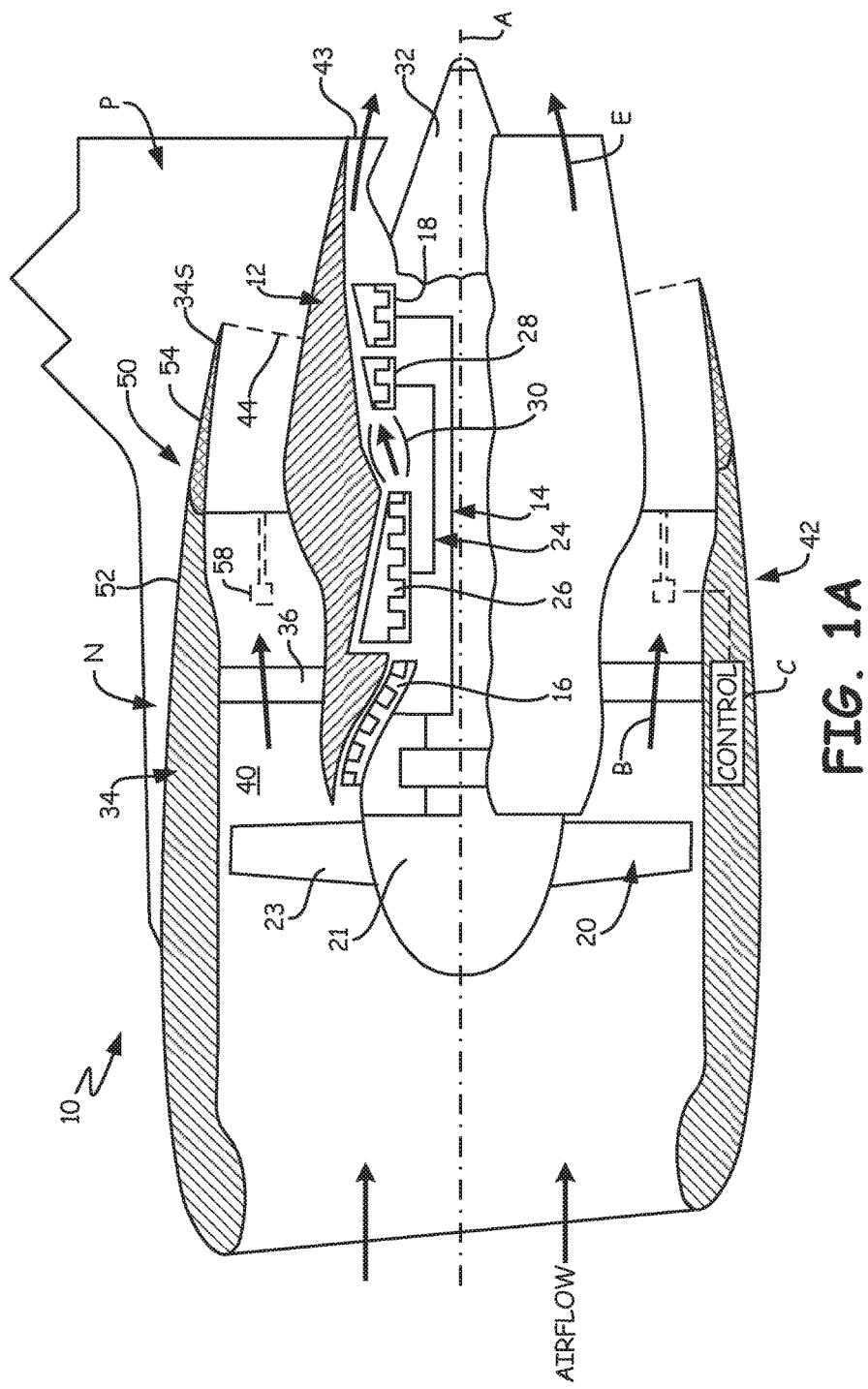
FIG. 1A is a general schematic partial fragmentary view of an exemplary gas turbine engine embodiment for use with the present disclosure.

FIG. 1A illustrates a general partial fragmentary schematic view of gas turbofan engine 10 suspended from engine pylori P within engine nacelle assembly N as is typical of an aircraft designed for subsonic operation.

Turbofan engine 10 includes a core engine within core nacelle 12 that houses low spool 14 and high spool 24. Low spool 14 includes low pressure compressor 16 and low pressure turbine 18. Low spool 14 also drives fan section 20 either directly or through a gear architecture. Fan section 20 includes fan hub 21 and fan blades 23 mounted on fan hub 21. High spool 24 includes high pressure compressor 26 and high pressure turbine 28. Combustor 30 is arranged between high pressure compressor 26 and high pressure turbine 28. Low and high spools 14, 24 rotate about engine axis of rotation A. It should be understood, however, that this disclosure is applicable to various other gas turbine engines.

Airflow enters fan nacelle 34, which at least partially surrounds core nacelle 12. Fan section 20 communicates airflow into core nacelle 12 to power low pressure compressor 16 and high pressure compressor 26. Core airflow compressed by low pressure compressor 16 and high pressure compressor 26 is mixed with the fuel in combustor 30 and expanded over high pressure turbine 28 and low pressure turbine 18. Turbines 28, 18 are coupled for rotation with, respective, spools 24, 14 to rotationally drive compressors 26, 16 and fan section 20 in response to the expansion. Core engine exhaust E exits core nacelle 12 through core nozzle 43 defined between core nacelle 12 and tail cone 32.

Core nacelle 12 is supported within fan nacelle 34 by circumferentially spaced fan exit guide vanes (FEGVs) 36.

Bypass flow path 40 is defined between core nacelle 12 and fan nacelle 34. Engine 10 generates a bypass flow arrangement with a bypass ratio in which substantial percent of the airflow which enters fan nacelle 34 becomes bypass flow B. The bypass flow B communicates through the generally annular bypass flow path 40 and is discharged from engine 10 through variable area fan nozzle (VAFN) 42 which defines nozzle exit area 44 between fan nacelle 34 and core nacelle 12 at fan nacelle end segment 34S of fan nacelle 34 downstream of fan section 20.

Thrust is a function of air density, velocity/acceleration, and air mass through the area. One or more of these parameters can be manipulated to vary the amount and direction of thrust provided by bypass flow B. VAFN 42 operates to effectively vary the area of fan nozzle exit area 44 to selectively adjust the pressure ratio of bypass flow B in response to controller C. Low pressure ratio turbofans are desirable for their high propulsive efficiency. However, low pressure ratio fans may be inherently susceptible to fan stability/flutter problems at low power and low flight speeds. VAFN 42 allows the engine to change to a more favorable fan operating line at low power, avoiding the instability region, and still provide the relatively smaller nozzle area necessary to obtain a high-efficiency fan operating line at cruise.

A significant amount of thrust is provided by bypass flow B due to the high bypass ratio. Fan section 20 of the engine 10 is preferably designed for a particular flight condition—typically cruise at 0.8 M and 35,000 feet. As fan blades 23 within fan section 20 are efficiently designed at a particular fixed stagger angle for an efficient cruise condition, VAFN 42 is operated to effectively vary fan nozzle exit area 44 to adjust fan bypass air flow such that the angle of attack or incidence on fan blades 23 is maintained close to the design incidence for efficient engine operation at other flight conditions, such as landing and takeoff to thus provide optimized engine operation over a range of flight conditions with respect to performance and other operational parameters such as noise levels.

Figure 1B:
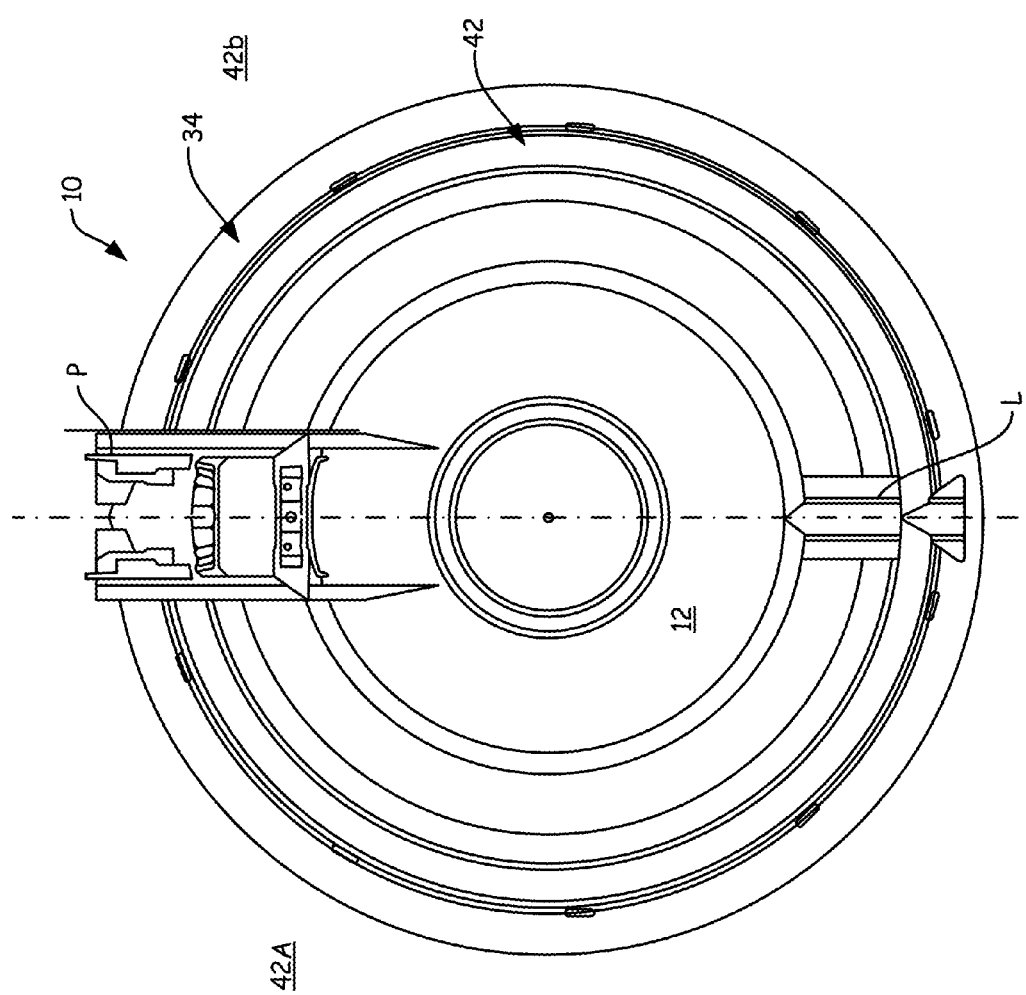
FIG. 1B is a rear view of the engine.
Figure 1C:
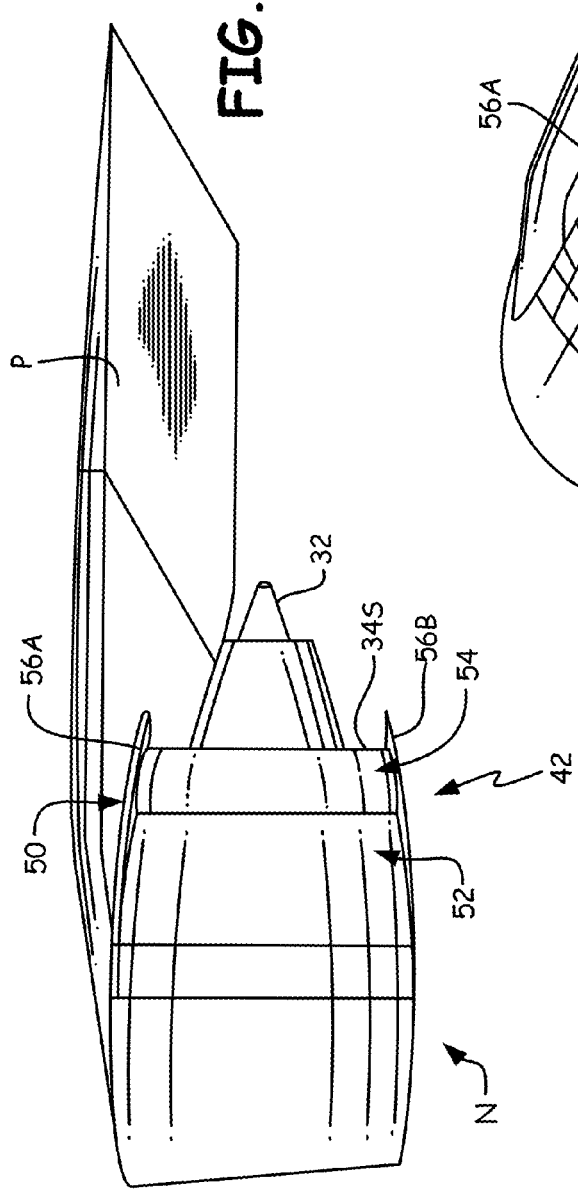
FIG. 1C is a side view of the engine integrated with a pylori.
Figure 1D:
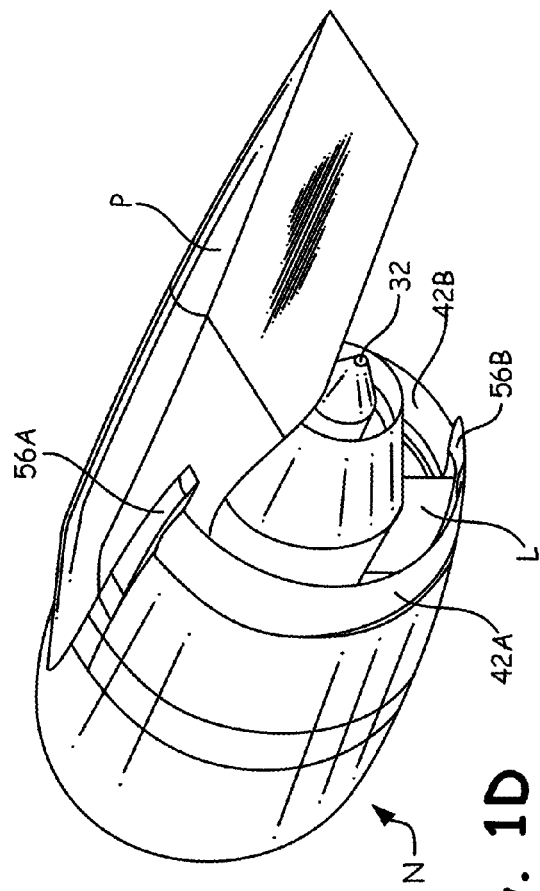
FIG. 1D is a rear perspective view of the engine integrated with a pylori.

VAFN 42 may be separated into at least two sectors 42A-42B (FIG. 1B) defined between pylori P and lower Bi-Fi splitter L which typically interconnects a larger diameter fan duct reverser cowl and a smaller diameter core cowl (FIGS. 1C and 1D). Each of at least two sectors 42A-42B are independently adjustable to asymmetrically vary fan nozzle exit area 44 to generate vectored thrust. It should be understood that although two segments are illustrated, any number of sectors and segments may alternatively or additionally be provided.

VAFN 42 generally includes auxiliary port system 50 having first fan nacelle section 52 and second fan nacelle section 54 movably mounted relative first fan nacelle section 52. Second fan nacelle section 54 axially slides along engine axis A relative fixed first fan nacelle section 52 to change the effective area of fan nozzle exit area 44. Second fan nacelle section 54, in one non-limiting embodiment, slides aftward upon track fairing 56A, 56B (illustrated schematically in FIGS. 1C and 1D) in response to actuator 58 (illustrated schematically). Track fairing 56A, 56B extend from first fan nacelle section 52 adjacent respective pylori P and lower Bi-Fi splitter L (FIG. 1D).

VAFN 42 changes the physical area and geometry of bypass flow path 40 during particular flight conditions. Bypass flow B is effectively altered by sliding of second fan nacelle section 54 relative first fan nacelle section 52 between a closed position (FIG. 2A) and an open position (FIG. 2B). Auxiliary port system 50 is closed by positioning second fan nacelle section 54 in-line with first fan nacelle section 52 to define fan nozzle exit area 44 as exit area F0 (FIG. 2A).

VAFN 42 is opened by moving second fan nacelle section 54 aftward along track fairing 56A, 56B away from first fan nacelle section 52 to open auxiliary port 60 (FIG. 2B) which extends between open second fan nacelle section 54 relative first fan nacelle section 52 to essentially provide an increased fan nozzle exit area 44 exit area F1. That is, exit area F1 with auxiliary port 60 (FIG. 2B) is greater than exit area F0 (FIG. 2A).

In one non-limiting embodiment, auxiliary port 60 is incorporated within bypass flow path 40 aft of fan exit guide vanes 36 (FEGVs). Auxiliary port 60 is located through the bypass duct outer wall. It should be understood that various forms of port arrangements are encompassed hereby.

In operation, VAFN 42 communicates with controller C to move second fan nacelle section 54 relative first fan nacelle section 52 of auxiliary port system 50 to effectively vary the area defined by fan nozzle exit area 44. Various control systems including an engine controller or an aircraft flight control system may also be usable with the present disclosure. By adjusting the axial position of the entire periphery of second fan nacelle section 54 in which all sectors are moved simultaneously, engine thrust and fuel economy are maximized during each flight regime by varying the fan nozzle exit area. By separately adjusting the sectors of second fan nacelle section 54 to provide asymmetrical fan nozzle exit area 44, engine bypass flow is selectively vectored to provide, for example only, trim balance, thrust controlled maneuvering, enhanced ground operations and short field performance.

Figure 3:
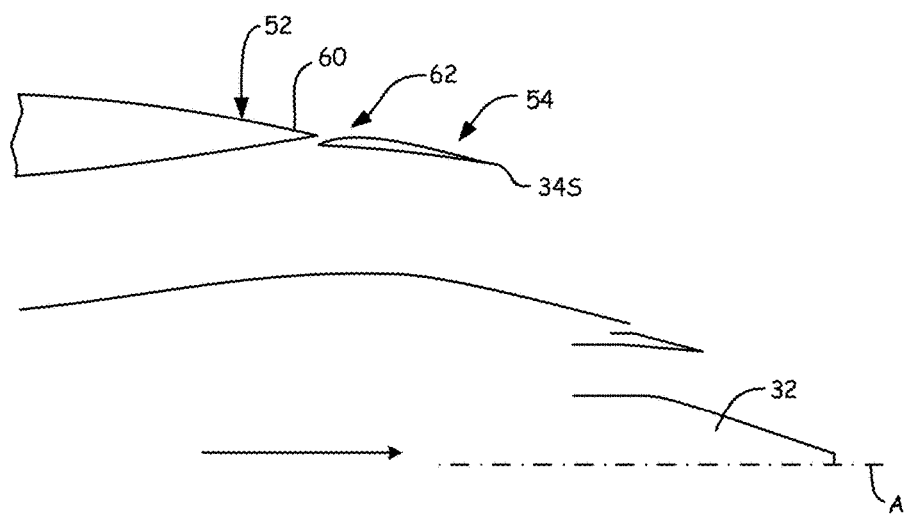
FIG. 3 is a sectional side view of the VAFN with an increased airfoil leading edge radius relative to a baseline configuration.
Figure 4:
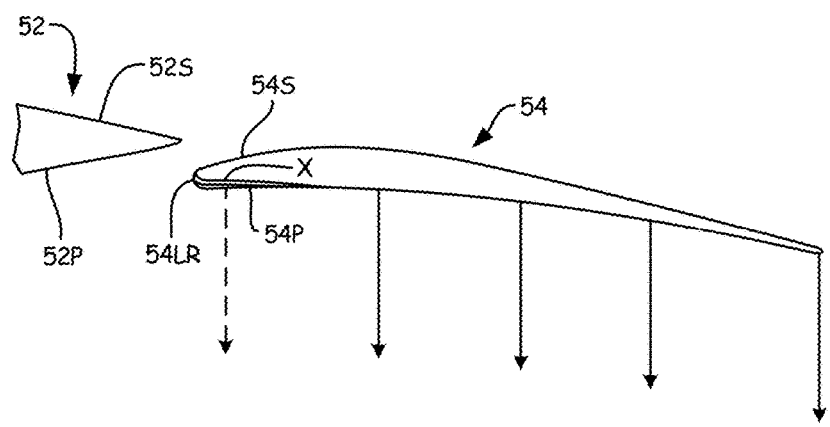
FIG. 4 is an expanded sectional side view of the VAFN with an increased airfoil leading edge radius relative to a baseline configuration radius of $0.05\delta$ where $\delta$ is an upstream boundary layer thickness.

Referring to FIG. 3, second fan nacelle section 54 includes leading edge region 62 with an increased airfoil leading edge radius of approximately $0.1\delta$-$0.5\delta$ relative to baseline configuration X. Baseline configuration X contemplates a chamfered or minor radiused leading edge in which baseline configuration X is approximately $0.05\delta$, where $\delta$ is an upstream boundary layer thickness (FIGS. 4 and 5).

Upstream turbulence has been determined to result from turbulent boundary layers which expand from the upstream fixed nacelle wall, turbulence which evolves from the upstream FEGV 36 wakes or endwall effects, and flow separation that may occur from the contour of the upstream fixed nacelle wall. The acoustic response of VAFN 42 is driven by a similar mechanism as that of airfoil turbulence ingestion leading edge noise. This source distribution is dipole in nature and may not exhibit a significant reduction in forward flight. This source behavior may lead to a significant sideline and aft angle contribution, thereby increasing the aircraft effective perceived noise level (EPNL).

Figure 5:
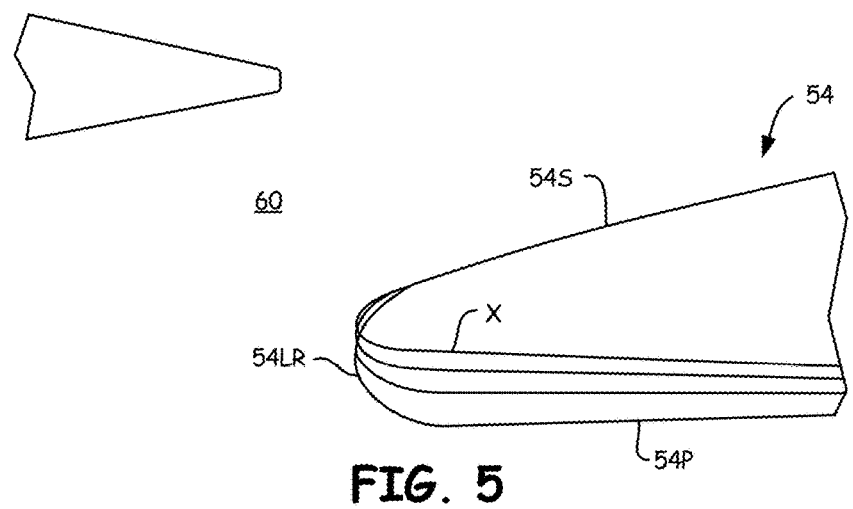
FIG. 5 is an expanded sectional side view of the increased airfoil leading edge radius relative to a baseline configuration.

In one non-limiting embodiment, suction surface 54S of second fan nacelle section 54 airfoil is held constant to maintain port exit flow area, as leading edge radius 54LR on pressure surface 54P is altered to provide increased airfoil leading edge radius 54LR relative baseline configuration X (FIG. 5). Increased airfoil leading edge radius 54LR in one non-limiting embodiment is confined to approximately the first quarter chord of second fan nacelle section 54, with changes to the immediate leading edge region 62 and relatively less deviation from baseline configuration X over the chordal distance toward trailing edge 34S. The change to pressure surface 54P is only affected over the first quarter (¼) chord of the airfoil shape resulting in only a local limited induct area change with no impact to overall fan nozzle exit area. In a closed configuration, the increased leading edge creates a step height, which may increase induct losses. A balance may thereby be realized between this loss and the noise benefit, or pressure surface 52P of first fan nacelle section 52 should be modified to accommodate the increased airfoil leading edge. Through redefinition of pressure surface 54P to correspond with an increase in the airfoil leading edge radius relative to baseline configuration X, the total effective perceived noise level (EPNL) is reduced.

Figure 6:
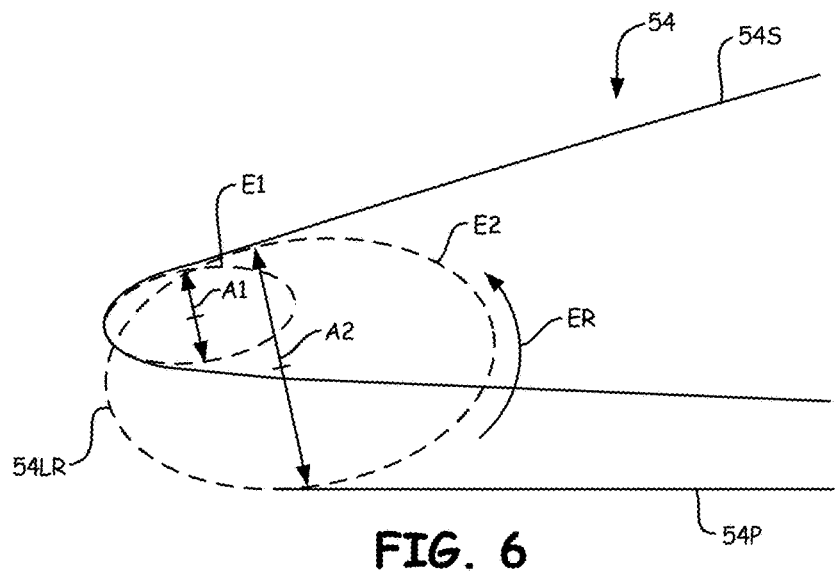
FIG. 6 is a schematic view of a geometric method to increase the airfoil leading edge radius relative to a baseline configuration.

Referring to FIG. 6, to effectuate an increase in leading edge radius 54LR, elliptical contour E1 that defines the airfoil leading edge shape in baseline configuration X is increased along a semi-minor axis (A1 to A2) to define larger elliptical contour E2 then rotated (illustrated schematically by arrow ER) to align tangentially to suction surface 54S. This preserves much of the aerodynamic characteristics of baseline configuration X with only the overall thickness, i.e. height of elliptical contour's semi-minor axis (E1 to E2), being manipulated. VAFN 42 operates to increase fan nozzle exit area 44, however, port system 50 forms the bulk of the area increase. This increase in leading edge radius generally maintains overall nozzle exit area 44, but affects only the pressure surface of the leading edge region of port system 50.

The method disclosed herein has demonstrated considerable potential for leading edge noise reduction in the dominant frequency range of baseline airfoil shape X, for an increase of approximately 150% in leading edge radius 54LR. This noise reduction exhibits a non-linear dependency on the proximity of second fan nacelle section 54 to upstream first fan nacelle section 52 to provide an increased acoustic reduction as VAFN 42 moves toward the open position. Maximum leading edge radius 54LR may be constrained with regard to bypass flow B when VAFN 42 is in the closed position (FIG. 2A). That is, leading edge radius 54LR may be increased to a size which maximizes the reduction in boundary layer turbulence ingestion through port 60 but minimizes the impact on bypass flow B when VAFN 42 is in a closed position (FIG. 2B).

Flow properties of the ingested boundary layer, such as turbulence level, integral length scale, and Mach number, also play a role, however, based on fixed upstream conditions, a noise improvement upwards of 3 dB in sound power level 3 can be expected at high Mach number, with further improvement attained at a low Mach number operations. With second fan nacelle section 54 in an open position, upwards of 5 dB has been expected.

The method disclosed herein preserves an area of auxiliary port 60 as well as internal area distribution, as only a relatively minimal change to the airfoil mean camber is required to include both tone and broadband acoustic reductions. The change to pressure surface 54P is one affected over the first quarter (¼) chord of the airfoil shape resulting in only a local limited induct area change with minimal impact to overall fan nozzle exit area. In a closed configuration, the increased leading edge creates a step height, which may increase induct losses. A balance may thereby be realized between this loss and the noise benefit.

Figure 7:
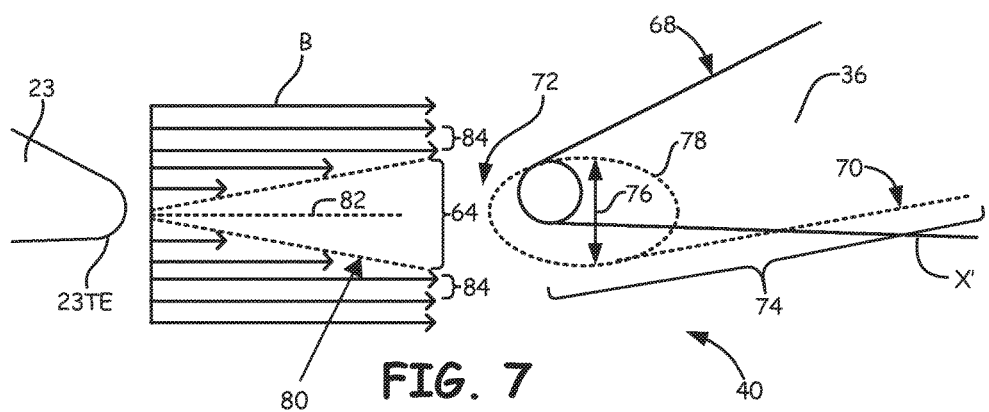
FIG. 7 is a schematic view of an embodiment of a leading edge portion of a fan exit guide vane modified from a baseline configuration based on a velocity profile of a wake produced by a fan blade.
Figure 8:
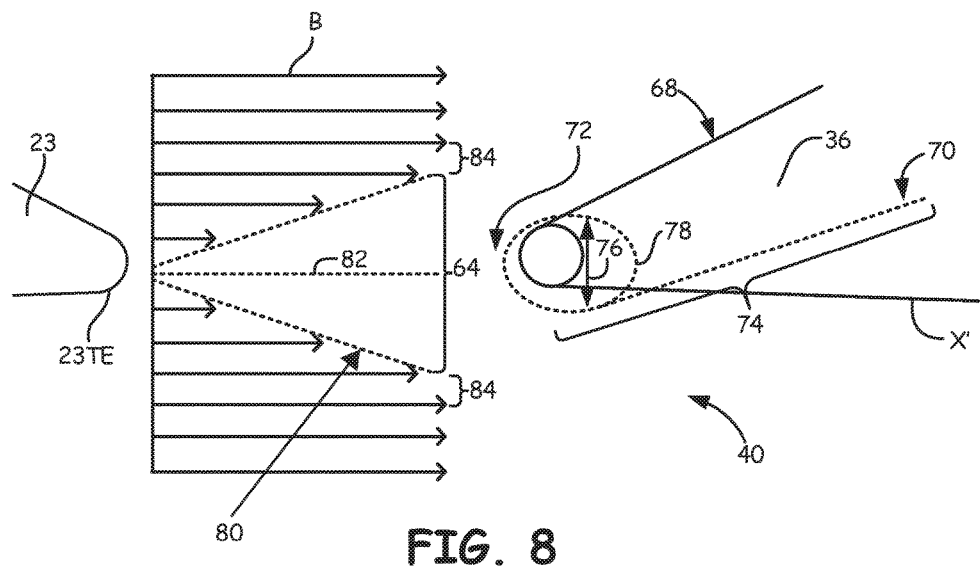
FIG. 8 is a schematic view of another embodiment of the leading portion edge of the fan exit guide vane modified from a baseline configuration based on a velocity profile of a wake produced by a fan blade.

The present invention can be applied to many types of airflow structures beyond VAFN applications. Indeed, nearly any airfoil can include a leading edge configured according to the present disclosure, including upstream/downstream airfoil cascades in which the upstream cascade produces wakes or turbulence that may reach the downstream cascade. FIGS. 7-8 illustrate examples of an upstream rotor and downstream vane assembly with noise reduction. FIG. 7 is a schematic view of an embodiment of leading edge portion 72 of one of fan exit guide vanes (FEGVs) 36 modified from baseline configuration X'. FIG. 8 is a schematic view of another embodiment of leading edge portion 72 of one of fan exit guide vanes (FEGVs) 36 modified from baseline configuration X'. FEGVs 36 are disposed in bypass flow path 40 downstream from fan blades 23. Bypass flow B flows between fan blades 23 and FEGVs 36 and trailing edge 23TE of fan blades 23 produces wakes 64. As shown in FIGS. 7-8, FEGVs 36 include baseline configuration X', suction surface 68, pressure surface 70, and leading edge region 72. Leading edge region 72 of FEGVs 36 includes leading edge thickness 76 and elliptical contour 78. A portion of pressure surface 70 and a portion of elliptical contour 78 together form profile 74. Wake 64 includes velocity profile 80 with wake centerline 82 and wake outer edges 84.

Similar to leading edge radius 54LR of VAFN 42 discussed above in the description of FIGS. 4-6, pressure surface 70 and leading edge region 72 of FEGVs 36 can be modified from baseline configuration X' of FEGVs 36 to reduce noise generated by the interaction between leading edge region 72 of FEGVs 36 and wakes 64 created by fan blades 23. Baseline configuration X' of FEGVs 36 can be an aerodynamic configuration of FEGVs 36 that is generally produced in a design phase of FEGVs 36 before acoustic properties and performance of FEGVs 36 are considered or finalized by a designer of FEGVs 36. As shown in FIGS. 7-8, baseline configuration X' is represented as solid lines on FEGVs 36. Similar to leading edge radius 54LR of VAFN 42 discussed above in the description of FIGS. 4-6, leading edge region 72 of FEGVs 36 can be represented as elliptical contour 78. Elliptical contour 78 of leading edge region 72 joins suction surface 68 and pressure surface 70. Leading edge thickness 76 deviates from baseline configuration X' and can be based on a thickness of wake 64. The thickness of wake 64 is the distance between wake outer edges 84 in a generally circumferential direction. Wake outer edges 84 are each defined in one embodiment as where a velocity wake 64 is approximately equal to 99 percent of a free stream flow velocity of bypass flow B. Leading edge thickness 76 of FEGVs 36 can be approximately half as thick to one times as thick as the thickness of wake 64. In the embodiments of FIGS. 7-8, leading edge thickness 76 defines a minor axis of elliptical contour 78. Similar to the embodiment of VAFN 42 shown in FIG. 4, a portion of pressure surface 70 deviates from baseline configuration X' to accommodate for increasing leading edge thickness 76.

The portion of pressure surface 70 that deviates from baseline configuration X' and a portion of elliptical contour 78 of leading edge region 72 together form profile 74. Similar to the embodiment of VAFN 42 shown in FIG. 4, profile 74 extends from leading edge region 72 downstream and across approximately a first quarter of a chord of one of FEGVs 36. Approximately after the first quarter of the chord of FEGV 36, profile 74 can transition to a pressure surface of baseline configuration X'. From leading edge region 72 to approximately after the first quarter of the chord of FEGV 36, profile 74 on pressure surface 70 can deviate from baseline configuration X' in a direction substantially parallel to a portion of velocity profile 80 of wake 64 before transitioning into baseline configuration X'. As shown in FIGS. 7 and 8, profile 74 is parallel to the portion of velocity profile 80 of wake 64 defined between wake centerline 82 and one of wake outer edges 84.

While profile 74 deviates a portion of pressure surface 70 from baseline configuration X', suction surface 68 of FEGV 36 is maintained at baseline configuration X'. As profile 74 extends from leading edge region 72 across the first quarter of the chord of FEGV 36, profile 74 reduces a thickness gradient between suction surface 68 and pressure surface 70 proximate leading edge region 72 relative baseline configuration X' of FEGV 36. By reducing the thickness gradient between suction surface 68 and pressure surface 70 proximate leading edge region 72, profile 74 reduces a volumetric strain experienced by wake 64 as wake 64 interacts with leading edge region 72 relative to a volumetric strain that wake 64 would experience from interacting with a leading edge according to baseline configuration X'. Noise generated by the interaction between wake 64 and leading edge region 72 of FEGV 36 is directly related to the volumetric strain wake 64 experiences as it interacts with leading edge region 72, reducing the volumetric strain experienced by wake 64 reduces the noise generated during the interaction. Decreasing the noise generated by the interaction of FEGV 36 with wake 64 from fan blades 23 can help decrease aircraft effective perceived noise level (EPNL). Because profile 74 only extends approximately across the first quarter of the cord of FEGV 36, profile 74 does not significantly impact a flow area across FEGV 36 in bypass flow path 40.

As demonstrated by the differences between the embodiment in FIG. 7 and the embodiment of FIG. 8, the thickness of wake 64 may increase or decrease depending upon performance parameters selected in the design of fan blades 23. Fan blade count and fan rotor speeds are some performance parameters that may affect the thickness of wake 64. In the embodiments of FIGS. 7 and 8, gas turbofan engine 10, shown in FIG. 1, comprises approximately 20 to 50 FEGVs 36 and approximately 14 to 22 fan blades that generate flow speeds of approximately Mach 0.3-0.75 across FEGVs 36. Because leading edge thickness 76 and profile 74 of FEGVs 36 are based on the thickness of wakes 64, leading edge thickness 76 and profile 74 can be adjusted as the thickness of wakes 64 changes due to changes in the performance parameters of fan blades 23.

In view of the foregoing description, it will be recognized that the present disclosure provides numerous advantages and benefits. For example, the present disclosure provides fan exit guide vanes (FEGV) 36 with leading edge region 72 and profile 74 on pressure side 70. Leading edge region 72 and profile 74 can help reduce the noise generated by the interaction between FEGV 36 and wakes 64 caused by fan blades 23. Leading edge region 72 and profile 74 can help reduce the noise without significantly affecting the flow area across bypass flow path 40.

DISCUSSION OF POSSIBLE EMBODIMENTS

The following are non-exclusive descriptions of possible embodiments of the present invention.

In one embodiment, a gas turbine engine includes a first airflow structure and a second airflow structure disposed aft of the first airflow structure. The second airflow structure includes a leading edge region. A thickness of the leading edge region is based on a thickness of a wake in the airflow produced by the first airflow structure when the airflow passes between the first airflow structure and the second airflow structure.

The gas turbine engine of the preceding paragraph can optionally include, additionally and/or alternatively, any one or more of the following features, configurations and/or additional components:

wherein the leading edge region of the second airflow structure is approximately half as thick to one times as thick as the thickness of the wake;

wherein the leading edge region of the second airflow structure is defined as an elliptical contour, and the thickness of the leading edge region is defined by a minor axis of the elliptical contour; and/or wherein the minor axis of the elliptical contour is approximately half as thick to one times as thick as the thickness of the wake.

In another embodiment, a gas turbine engine includes a rotor with a blade, and a vane disposed aft of the rotor for adjusting an airflow from the rotor. The vane has a suction surface, a pressure surface, and a leading edge region joining the suction surface and the pressure surface. The leading edge region and a portion of the pressure surface form a profile that is substantially parallel to a portion of a velocity profile of a wake produced in the airflow by the blade.

The gas turbine engine of the preceding paragraph can optionally include, additionally and/or alternatively, any one or more of the following features, configurations and/or additional components:

wherein the profile extends from the leading edge region across approximately a quarter of a chord of the vane;

wherein the portion of the velocity profile of the wake is defined between a centerline of the wake to an outer edge of the wake, the outer edge of the wake defined where a velocity of the wake is approximately equal to 99 percent of a free stream flow velocity of the airflow;

wherein the leading edge region of the vane is approximately half as thick to one times as thick as the thickness of the wake;

wherein the leading edge region of the vane is defined as an elliptical contour, and the thickness of the leading edge region is defined by a minor axis of the elliptical contour;

wherein the rotor is a fan rotor, the blade is a fan blade, and the vane is a fan exit guide vane; and/or wherein the engine comprises approximately 14 to 22 fan blades and approximately 20 to 50 fan exit guide vanes.

In yet another embodiment, a method for optimizing a vane to reduce noise generated by airflow between an upstream blade and the vane includes first establishing an aerodynamic configuration of the vane as a baseline configuration of the vane. A wake thickness is determined of a wake in the airflow produced by the blade. A leading edge thickness of the vane is adjusted relative the baseline configuration based on the wake thickness.

The method of the preceding paragraph can optionally include, additionally and/or alternatively, any one or more of the following features, configurations and/or additional components:

wherein the method further comprises determining a velocity profile of the wake and adjusting a profile of a pressure surface of the vane proximate a leading edge region of the vane relative the baseline configuration such that the profile of the pressure surface proximate the leading edge region is substantially parallel to at least a portion of the velocity profile of the wake;

wherein the profile deviates from a pre-established aerodynamic configuration of the vane, and the profile reduces a thickness gradient between the suction surface and the pressure surface proximate the leading edge region relative the pre-established aerodynamic configuration of the vane;

wherein the profile reduces a volumetric strain of the wake relative the pre-established aerodynamic configuration of the vane;

wherein the thickness of the leading edge region of the vane is adjusted to be approximately half as thick to one times as thick as the thickness of the wake; and wherein the method further comprises maintaining a profile of a suction surface of the vane at the baseline configuration; and/or wherein the method further comprises transitioning the profile of the pressure surface of the vane to a pressure surface of the baseline configuration downstream from the leading edge region at approximately one quarter of a chord of the vane.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, while the specification describes leading edge region 72 and profile 74 as being part of fan exit guide vane (FEGV) 36, leading edge region 72 and profile 74 may be incorporated into a compressor vane, an exit vane, a turbine vane or other airfoil or airflow structure without departing from the essential scope of the invention. Therefore, it is intended that the invention not be limited to the particular embodiment(s) disclosed, but that the invention will include all embodiments falling within the scope of the appended claims.

The invention claimed is:

1. A gas turbine engine, comprising:
a rotor with a blade;
a vane disposed aft of the rotor for adjusting an airflow from the rotor, the vane having a suction surface, a pressure surface, and a leading edge region joining the suction surface and the pressure surface; and
wherein the leading edge region and a portion of the pressure surface form a profile that is substantially parallel to a portion of a velocity profile of a wake produced in the airflow by the blade, wherein the wake and the velocity profile of the wake are disposed in the airflow downstream of the blade and upstream of the leading edge region of the vane, and
wherein the profile is confined within a quarter of a chord of the vane from the leading edge region.

2. The gas turbine engine of claim 1, wherein the portion of the velocity profile of the wake is defined between a centerline of the wake to an outer edge of the wake, the outer edge of the wake defined where a velocity of the wake is approximately equal to 99 percent of a free stream flow velocity of the airflow.

3. The gas turbine engine of claim 1, wherein the leading edge region of the vane is approximately half as thick to one times as thick as the thickness of the wake.

4. The gas turbine engine of claim 1, wherein the leading edge region of the vane is defined as an elliptical contour, and the thickness of the leading edge region is defined by a minor axis of the elliptical contour.

5. The gas turbine engine of claim 1, wherein the rotor is a fan rotor, the blade is a fan blade, and the vane is a fan exit guide vane.

6. The gas turbine engine of claim 5, wherein the engine comprises approximately 14 to 22 fan blades and approximately 20 to 50 fan exit guide vanes.

7. A method for optimizing a vane to reduce noise generated by airflow between an upstream blade and the vane, the method comprising:

establishing an aerodynamic configuration of the vane as a baseline configuration of the vane;

determining a wake thickness of a wake in the airflow produced by the blade, wherein the wake is disposed in the airflow downstream of the blade and upstream of the vane; and adjusting a leading edge thickness of the vane relative to the baseline configuration based on the wake thickness such that a leading edge region of the vane and a portion of a pressure surface of the vane form a profile that is substantially parallel to a portion of a velocity profile of the wake downstream of the blade and upstream of the leading edge region of the vane, wherein the adjusting of the leading edge thickness of the vane is confined within a quarter of a chord of the vane from the leading edge region of the vane.

8. The method of claim 7, wherein the method further comprises:
determining a velocity profile of the wake; and
adjusting the profile of the pressure surface of the vane proximate the leading edge region of the vane relative the baseline configuration such that the profile of the pressure surface proximate the leading edge region is substantially parallel to at least the portion of the velocity profile of the wake.

9. The method of claim 8, wherein the profile deviates from a pre-established aerodynamic configuration of the vane, and the profile reduces a thickness gradient between a suction surface and the pressure surface proximate the leading edge region relative the pre-established aerodynamic configuration of the vane.

10. The method of claim 8, wherein the profile reduces a volumetric strain of the wake relative the pre-established aerodynamic configuration of the vane.

11. The method of claim 7, wherein the thickness of the leading edge of the vane is adjusted to be approximately half as thick to one times as thick as the thickness of the wake.

12. The method of claim 7, the method further comprising:
maintaining a profile of a suction surface of the vane at the baseline configuration.

13. The method of claim 7, the method further comprising:
transitioning the profile of the pressure surface of the vane to a pressure surface of the baseline configuration downstream from the leading edge region at approximately one quarter of a chord of the vane.

14. A gas turbine engine, comprising:
a first airflow structure;
a second airflow structure disposed aft of the first airflow structure, the second airflow structure having a leading edge region; and
wherein a thickness of the leading edge region is based on a thickness of a wake in the airflow produced by the first airflow structure when the airflow passes between the first airflow structure and the second airflow structure,
wherein the leading edge region of the second airflow structure is approximately half as thick to one times as thick as the thickness of the wake,
wherein the second airflow structure includes a pressure surface with a profile proximate the leading edge region that is substantially parallel to at least a portion of a velocity profile of the wake, and
wherein the wake and the velocity profile of the wake are disposed in the airflow downstream of the blade and upstream of the leading edge region of the vane.

15. The gas turbine engine of claim 14, wherein the leading edge region of the second airflow structure is defined as an elliptical contour, and the thickness of the leading edge region is defined by a minor axis of the elliptical contour.

16. The gas turbine engine of claim 15, wherein the minor axis of the elliptical contour is approximately half as thick to one times as thick as the thickness of the wake.

* * * * *

UNITED STATES PATENT AND TRADEMARK OFFICE
CERTIFICATE OF CORRECTION

PATENT NO. : 10,287,987 B2
APPLICATION NO. : 14/204983
DATED : May 14, 2019
INVENTOR(S) : Constantine Baltas and Oliver V. Atassi It is certified that error appears in the above-identified patent and that said Letters Patent is hereby corrected as shown below:

In the Specification

Column 2, Line 6:
Delete "pylori"
Insert --pylon--

Column 2, Line 8:
Delete "pylori"
Insert --pylon--

Column 2, Line 39:
Delete "pylori"
Insert --pylon--

Column 3, Line 41:
Delete "pylori"
Insert --pylon--

Signed and Sealed this
Sixteenth Day of July, 2019

Andrei Iancu
*Director of the United States Patent and Trademark Office*